2,863,894

PRODUCTION OF ALUMINIUM ALKYLS

Peter Smith, Norton-on-Tees, England, assignor to Imperial Chemical Industries Limited, London, England, a corporation of Great Britain No Drawing. Application January 10, 1955
Serial No. 481,039

Claims priority, application Great Britain
January 22, 1954

11 Claims. (Cl. 260—448)

This invention relates to the production of aluminium alkyls.

Aluminium alkyls are known as catalysts for the dimerisation of olefines.

It is known to prepare aluminium alkyls, for example aluminium triethyl, by reacting stoichiometric quantities of an alkyl halide and aluminium to produce an alkyl aluminium sesquihalide, isolating the sesquihalide by distillation, reacting the sesquihalide with sodium to yield an aluminium alkyl and separating the alkyl from the final reaction product by distillation.

Throughout this specification the term "sesquihalide" is to be taken to mean a mixture of mono- and di-alkyl metal halides of the general formulae $RAlX_2$ and $R_2AlX$ where R denotes an alkyl group and X denotes a halogen atom.

The above described process has several serious disadvantages. For instance, since aluminium alkyls are toxic and spontaneously inflammable, handling them, particularly in the vapour phase as in their isolation by distillation, requires great care. Again, when aluminium alkyls are to be used as polymerisation catalysts it is essential that they should contain little, if any, aluminium alkyl halides since such compounds act as catalysts for Friedel-Crafts type reactions. The complete decomposition of aluminium alkyl halides by sodium according to the known process is a very laborious and inefficient operation since it is necessary to carry out the treatment with sodium several times because the sodium rapidly becomes coated with sodium halide and hence becomes non-reactive. The use of excess sodium also leads to the formation of insoluble complex alkyls such as $NaAlEt_4$ with consequent loss of the desired alkyl.

It is convenient in reactions using an aluminium alkyl as a catalyst to dissolve the catalyst in a suitable solvent. It is therefore an object of the present invention to provide a process by which aluminium alkyls can be produced in the form of a solution in a suitable solvent which solution can then be used as a catalyst without first isolating the aluminium alkyl.

I have found an elegant and convenient process for the production of aluminium alkyls utilising reactions similar to those hereinbefore described but carried out in the presence of a solvent, in which the reactions are much easier to control than in the absence of a solvent and by which much improved yields of the desired compounds, substantially free from undesired halogenated compounds, are obtained. In this process it is unnecessary to isolate the sesquihalide. The complete decomposition of the sesquihalide can also be effected without repeated treatment with alkali metal and the formation of complex alkyls by reaction between the aluminium alkyl and sodium is thereby minimised.

According to the present invention therefore, there is provided a process for the production of an aluminium alkyl which comprises a step of reacting aluminium with at least one primary alkyl halide as hereinafter defined, in the presence of an inert solvent, to form a sesquihalide and a step of reacting the sesquihalide with an alkali metal in the presence of an inert solvent to form the desired aluminium alkyl.

Primary alkyl halides suitable for use in the process of the invention are methyl chloride, bromide and iodide, ethyl chloride, bromide and iodide, propyl bromide and iodide, n-butyl bromide and iodide and isobutyl iodide.

If only one primary alkyl halide is used in the process of the invention an aluminium alkyl is produced in which the alkyl groups are identical while if two or more primary alkyl halides are used the alkyl may contain different alkyl groups.

The principal reactions taking place in the decomposition of the sesquihalide by an alkali metal may be represented as follows:

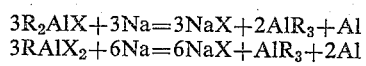

where R denotes an alkyl group and X denotes a halogen atom.

Thus, when the decomposition of the sesquihalide is carried out in the presence of an inert solvent, there is produced a solution of an aluminium alkyl and an insoluble residue which contains precipitated metallic aluminium and an alkali metal halide. The insoluble residue may also contain a complex metal alkyl, such as sodium aluminium tetraethyl, produced according to the equation:

$$3Na + 4AlR_3 = 3NaAlR_4 + Al$$

I have found that the aluminium in the insoluble residue is in a reactive form and that when the residue is recycled to the initial step of the process this aluminium reacts easily with further quantities of the alkyl halide. In this way a much improved conversion of the aluminium into its alkyl is effected. Also any complex metal alkyl in the recycled insoluble residue reacts with the sesquihalide to give further quantities of the aluminium alkyl. The reactions taking place may be represented as follows:

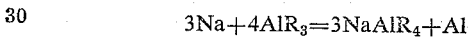

The alkali metal halide returned in the insoluble residue to the initial step of the process may be subsequently removed from the solution, preferably by filtration, before the sesquihalide is reacted with an alkali metal.

It is therefore a further feature of the process of the invention to separate the insoluble residue in the product of the process from the solution of an aluminium alkyl, and return this insoluble residue to the process where, preferably together with additional supplies of aluminium, the aluminium contained in the insoluble residue reacts with further quantities of the alkyl halide.

It is preferred that in the reaction between aluminium and a primary alkyl halide a small quantity of a sesquihalide should be present as a reaction initiator. It is also preferred that the sesquihalide should not be isolated prior to the reaction with an alkali metal and that the same solvent should be employed throughout the process.

In the process according to the invention the aluminium may be used in the form of an alloy with magnesium containing a low proportion of magnesium. A suitable source of such an alloy is aircraft scrap metal containing for example, about 10% of magnesium.

The temperature at which the formation of the sesquihalide, is carried out is limited by the boiling point of the reaction mixture which partly depends on the boiling point of the solvent used. It should be of a value sufficient to maintain a rapid, yet controllable, rate of reaction. It is preferred that the temperature should not exceed 50° C. since at temperatures up to 50° C. the reaction is, in general, easier to control and undesired side-reactions are minimised.

The maximum temperature at which reaction between the sesquihalide and an alkali metal is carried out should not exceed the temperature at which appreciable decomposition, under the reaction conditions employed, of the aluminium alkyl occurs. Subjected to this limitation it is preferred that the temperature should be at least high enough to maintain the alkali metal in the molten condition and if this temperature exceeds the boiling point of the reaction mixture sufficient pressure should be applied to raise the boiling point of the reaction mixture to, at least, the desired reaction temperature. It is preferred that the temperature should be in the range of about 100° C. to about 180° C.

All the materials used in the process should be dry and moisture should be excluded from the apparatus as completely as possible. An inert atmosphere must be maintained within the apparatus.

Solvents suitable for use in the process are those which dissolve the organic reactants and organic products and which are inert under the reaction conditions employed. Preferably the solvent should be free from aromatic compounds especially in the formation of the sesquihalide. This feature is particularly desirable in the formation of ethyl aluminium sesquihalide. When an alkyl halide gaseous at normal temperatures and pressures is a reactant it is particularly desirable that it should be easily soluble in the solvent. Solvents which form addition products with aluminium alkyls, e. g. ethers, may be used but if it is desired to prepare the aluminium alkyl in the pure state they may be unsuitable. I have found that paraffinic and saturated alicyclic hydrocarbons which are liquid under the conditions of the process according to the invention are particularly suitable solvents.

Any alkali metal or alkali metal alloy may be used in the process. We have found that an alloy of sodium and potassium having a low melting point for example, below about 30° C. is particularly suitable. The aluminium alkyls may be separated from the reaction product by fractional distillation under reduced pressure or the solution of the aluminium alkyl, may be filtered and used directly as a polymerisation catalyst after any necessary adjustment of the concentration of the solution.

In the following examples the apparatus used consisted of a flask fitted with a reflux condenser, a dropping funnel, an efficient stirrer and a siphon device for removing the reaction product from the flask.

The apparatus and all the reactants were substantially free from moisture. An atmosphere of dry nitrogen was maintained in the apparatus. The solvents used were substantially free from aromatics.

*Example 1*

43 grams aluminium powder (or turnings), 100 ml. methyl cyclohexane as a solvent and 2 grams ethyl aluminium sesquibromide as reaction initiator were placed in the flask and vigorously stirred. 50 grams ethyl bromide were then introduced into the flask which was gently warmed until the reaction commenced. A further 200 grams of ethyl bromide were then added at a rate just sufficient to maintain a gentle reflux rate. After the addition of the ethyl bromide was completed the reaction mixture was heated under reflux conditions for 2 hours to ensure that all the ethyl bromide had reacted.

600 ml. methyl cyclohexane were then introduced into the flask and the flask heated until reflux commenced. Heating was then discontinued, the contents of the flask vigorously stirred and 79.5 grams of a sodium-potassium alloy (K$_2$Na) added at a rate just sufficient to keep the solution boiling. After the addition of the alloy was complete the reaction mixture was vigorously stirred and heated under reflux conditions for 6 hours. The reaction product was then cooled, withdrawn from the reaction vessel and filtered to give a halogen-free solution of aluminium triethyl in methyl cyclohexane. The yield of aluminium triethyl in solution was 85% of the theoretical yield based on the ethyl bromide added. Fractional distillation of the solution gave an 80% yield of pure aluminium triethyl.

The preparation was repeated using decalin as a solvent instead of methyl cyclohexane. The yield of aluminium triethyl in solution obtained was 92% of the theoretical yield based on the ethyl bromide added.

In a further experiment ethyl aluminium sesquibromide was isolated as a colourless, spontaneously inflammable liquid by fractional distillation in vacuo of the product of the reaction between aluminium and ethyl bromide. The yield of ethyl aluminium sesquibromide was 90% of the theoretical yield based on the ethyl bromide added.

*Example 2*

160 grams gaseous ethyl chloride were slowly passed into a vigorously stirred suspension of 41 grams aluminium powder in 400 ml. cyclohexane containing 5 grams ethyl aluminium chloride as a reaction initiator. The initial temperature of the suspension was 25° C. and the addition of ethyl chloride was controlled so that the temperature of the reaction mixture did not exceed 50° C. If the reaction temperature was allowed greatly to exceed 50° C. a vigorous exothermic and autocatalytic reaction frequently occurred to give mainly ethane, aluminium chloride and a halogen-free polymer.

After the addition of ethyl chloride was complete ethyl aluminium sesquichloride was isolated as a colourless liquid from the reaction product by distillation in vacuo. The yield of ethyl aluminium chloride was 77% of the theoretical yield based on the ethyl chloride added. Similar yields were obtained when iso-octane, n-dodecane, methylcyclohexane or decalin were used as solvents instead of cyclohexane.

For the preparation of aluminium triethyl the preparation of the solution of ethyl aluminium sesquichloride was repeated using methylcyclohexane as a solvent. The solution was analysed for chlorine and an amount of a sodium-potassium alloy (K$_2$Na) theoretically required to react with the chlorine, added to the hot solution as described in Example 1. After cooling, the reaction product was filtered to give a solution of aluminium triethyl. The yield of aluminium triethyl was 89% of the theoretical yield based on the ethyl chloride added.

This preparation of aluminium triethyl was repeated using decalin as a solvent and either sodium or potassium instead of the sodium-potassium alloy. The yields of aluminium triethyl obtained were 82–89% of the theoretical yield.

*Example 3*

In this example the preparation of aluminium trimethyl, aluminium tripropyl, aluminium tri-n-butyl and aluminium tri-iso-butyl are described.

In experiments 1–6 inclusive a sesquihalide was prepared and isolated as described in Example 2 using 400 ml. cyclohexane as a solvent. Methyl bromide was added to the suspension of aluminium in the form of a gas while other alkyl halides were added in the liquid state. The sesquihalide was then dissolved in 400 ml. decalin and the solution heated until reflux commenced. Heating was then discontinued and sodium added in an amount theoretically required to react with the sesquihalide and at a rate sufficient to keep the solution boiling. After the addition of the sodium was complete the reaction mixture was vigorously stirred and heated under reflux conditions for 6 hours. The reaction product was then cooled and filtered to give a solution of the aluminium trialkyl in decalin.

In experiment 7 isobutyl iodide was reacted with aluminium in the presence of decalin to give a solution of the sesqui-iodide in decalin and this solution treated with sodium without isolating the sesquiiodide.

The following table shows the weights of aluminium and alkyl halide used, the yield of sesquihalide as a percentage of the theoretical yield based on the alkyl halide added and the overall yield of the aluminium trialkyl as a percentage of the theoretical yield based on the alkyl halide added.

| Expt. No. | Wt. of Al in grams | Alkyl halide | Wt. of alkyl halide in grams | Yield of sesqui-halide | Overall yield of AlR₃ |
|---|---|---|---|---|---|
| 1 | 13.5 | Methyl bromide | 80.5 | 53 | 50 |
| 2 | 13.5 | Methyl iodide | 71.2 | 53 | 53 |
| 3 | 27 | n-Propyl bromide | 184.5 | 33 | |
| 4 | 22.5 | n-Propyl iodide | 217 | 79 | 67 |
| 5 | 13 | n-Butyl bromide | 103 | 83 | 52 |
| 6 | 13.5 | n-Butyl iodide | 138 | 71 | 57 |
| 7 | 13.5 | Isobutyl iodide | 138 | | 65 |

*Example 4*

The following experiments demonstrate the recovery of aluminium from the insoluble residue formed in the decomposition of an alkyl sesquihalide by sodium by recycling the insoluble residue to the first step of the process.

100 grams of this insoluble residue, which contained 10 grams metallic aluminium were suspended in 250 ml. methyl cyclohexane, containing 2 grams ethyl aluminium sesquibromide as a reaction initiator, and reacted with 65 grams ethyl bromide under the conditions described in Example 1. The product was filtered to remove sodium halide and a yield of ethyl aluminium sesquibromide in solution obtained equal to 45% of the theoretical yield based on the ethyl bromide added.

This experiment was repeated using 100 grams of insoluble residue to which had been added 7 grams of powdered aluminium making a total of 17 grams of metallic aluminium in the residue. The yield of ethyl aluminium sesquibromide in solution obtained was 60% of the theoretical yield based on the ethyl bromide added.

*Example 5*

The insoluble residue formed in the decomposition of an alkyl aluminium sesquihalide by sodium may contain a complex alkyl, such as sodium aluminium tetraethyl, and the following experiments demonstrate the conversion of this complex alkyl to an aluminium alkyl by recycling the insoluble residue to the first step of the process.

5.4 grams aluminium triethyl dissolved in 150 ml. decalin were heated under reflux conditions for 8 hours with 0.82 gram sodium. Analysis of the solution showed that 29% of the aluminium originally present in solution, was now present in the insoluble residue as a complex alkyl.

The reaction product thus obtained was then heated under reflux conditions for 4 hours with 3.02 grams aluminium sesquichloride. After cooling and filtering the solution was analysed and it was found that 93% of the aluminium originally in solution was now in solution and that 78% of the chloride had been removed from solution.

I claim:

1. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert aromatic-free solvent to form a solution of sesquihalide dissolved in said inert solvent and thereafter reacting said sesquihalide with an alkali metal, without isolating said sesquihalide from said solution, to form said aluminium alkyl.

2. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert aromatic-free solvent to form a sesquihalide, reacting said sesquihalide without isolating the same with an alkali metal in the presence of said inert aromatic-free solvent to form a reaction product comprising an aluminium alkyl and an insoluble residue, separating said aluminium alkyl from said residue and reacting said residue with an additional quantity of a primary alkyl halide.

3. A process as claimed in claim 2 in which the solution of a sesquihalide is filtered from insoluble matter prior to the reaction between the sesquihalide and an alkali metal.

4. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert solvent free from aromatic compounds, to form a product comprising a sesquihalide, and reacting said product with an alkali metal in the presence of an inert solvent free from aromatic compounds, to form an aluminium alkyl.

5. A process for the production of an aluminum alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert aromatic-free solvent and at a temperature below 50° C. to form a product comprising a sesquihalide, and reacting said product with an alkali metal in the presence of said inert aromatic-free solvent to form an aluminium alkyl.

6. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert aromatic-free solvent to form a product comprising a sesquihalide, and reacting said product with an alkali metal in the presence of said inert aromatic-free solvent and at a temperature within the range 100° C. to 180° C. to form an aluminium alkyl.

7. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert aromatic-free solvent and at a temperature below 50° C. to form a product comprising a sesquihalide and reacting said product with an alkali metal in the presence of said inert aromatic-free solvent at a temperature within the range 100° C. to 180° C. to form an aluminium alkyl.

8. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of an inert aromatic-free solvent and at a temperature below 50° C. to form a product comprising a sesquihalide, and reacting said product with an alkali metal in the presence of an inert aromatic-free solvent at a temperature within the range 100° C. to 180° C. to form an aluminium alkyl, and an insoluble residue, separating said aluminium alkyl from said insoluble residue and reacting said insoluble residue with an additional quantity of a primary alkyl halide.

9. A process as claimed in claim 1 wherein said solvent is selected from the group consisting of paraffinic and saturated alicyclic hydrocarbons.

10. A process as claimed in claim 1 wherein said solvent is methyl cyclohexane.

11. A process for the production of an aluminium alkyl which comprises reacting aluminium with at least one primary alkyl halide selected from the group consisting of methyl chloride, methyl bromide, methyl iodide, ethyl chloride, ethyl bromide, ethyl iodide, propyl bromide, propyl iodide, n-butyl bromide, n-butyl iodide, and isobutyl iodide, in the presence of methyl cyclohexane and at a temperature below 50° C., thereby forming a solution of sesquihalide in said methyl cyclohexane, reacting said sesquihalide with an alkali metal, without isolating said sesquihalide from said solution, and at a temperature between 100° C. and 180° C., to form a reaction product comprising a solution of an aluminium alkyl dissolved in methyl cyclohexane, and an insoluble residue, separating said residue from said solution and reacting said residue, together with additional aluminium, with an additional quantity of a primary alkyl halide.

References Cited in the file of this patent

UNITED STATES PATENTS

| 2,691,668 | Ziegler et al. | Oct. 12, 1954 |
| 2,744,127 | Ziegler et al. | May 1, 1956 |

OTHER REFERENCES

Grosse et al.: J. Org. Chem. 5, pp. 106–121 (1940).